UNITED STATES PATENT OFFICE.

ALBERT P. TSCHIRNER, OF ST. LOUIS, MISSOURI.

POLISHING-PASTE.

SPECIFICATION forming part of Letters Patent No. 641,811, dated January 23, 1900.

Application filed October 9, 1899. Serial No. 733,016. (No specimens.)

*To all whom it may concern:*

Be it known that I, ALBERT P. TSCHIRNER, a citizen of the United States, residing at the city of St. Louis, State of Missouri, have invented a certain new and useful Improvement in Paste for Polishing Vulcanized Rubber Plates, of which the following is a full, clear, and exact description, such as will enable others skilled in the art to which it appertains to make and use the same, reference being had to the accompanying drawings, forming part of this specification, in which—

This invention relates to a new and useful improvement in paste for polishing vulcanized rubber plates, and is designed particularly for use in polishing plates of the character described, such as are employed in dentistry.

The object of the invention is to provide a paste which will impart a high polish and glossy finish to vulcanized rubber plates, said paste being practically insoluble in water.

The paste hereinafter described can be quickly and easily applied, and by the application of a brush or other suitable polishing medium will take a polish in a remarkably short time.

With these objects in view the invention consists in a paste composed of wax, resin, and potash, to which is added camphor, if desired to increase the gloss, and any suitable coloring-matter, said paste by reason of the chemical combination occurring between the ingredients being a semisaponaceous mass.

In preparing my improved paste I take about one ounce of resin and two ounces of wax—such as beeswax, Japanese wax, or other suitable wax—and melt the same by the application of heat, after which, if a high gloss is desired, I add about fifteen grains of preferably powdered camphor. I then add seven to fifteen grains of caustic potash, (preferably dissolved in a suitable quantity of water,) which chemically combines with the resin and wax and effects a partial saponification of the mass. Any suitable coloring-matter may be added, if desired. The paste is now allowed to cool, when it is ready for use. After the vulcanized rubber plate is molded, scraped, sandpapered, and rubbed down with pumice-stone and water or undergoes the usual steps necessary to prepare it to receive the polish my improved paste is applied thereto by using a cloth, brush, or other suitable medium, after which a polish may be imparted by rubbing with a brush, cloth, or buffing-wheel.

If it is desired to make the paste insoluble in water, lime can be substituted for the potash, when it will be necessary to heat the paste in use.

I am aware that slight changes may be made in the proportions of the several ingredients herein mentioned and also that other ingredients may be added and substituted for those herein set forth without in the least departing from the nature and principle of my invention.

Having thus described my invention, what I claim, and desire to secure by Letters Patent, is—

1. The herein-described polishing-paste for vulcanized rubber plates, consisting essentially of wax and a vegetable gum or gums partially saponified; substantially as described.

2. The herein-described polishing-paste, resulting from the mixing of wax, resin, caustic potash and camphor; substantially as described.

3. The herein-described polishing-paste, resulting from the mixing of wax, resin, caustic potash, camphor, and a suitable coloring-matter; substantially as described.

In testimony whereof I hereunto affix my signature, in the presence of two witnesses, this 6th day of October, 1899.

ALBERT P. TSCHIRNER.

Witnesses:
WM. H. SCOTT,
A. S. GRAY.